United States Patent [19]

Fukuda et al.

[11] Patent Number: 4,802,840
[45] Date of Patent: Feb. 7, 1989

[54] DIE FOR MOLDING HONEYCOMB STRUCTURES

[75] Inventors: Morio Fukuda; Masayuki Hanada, both of Kitakyushu; Hideo Inutsuka; Katsuya Ogata, both of Kishima, all of Japan

[73] Assignees: Catalysts & Chemicals Industries Co., Ltd., Tokyo; Iwao Jiki Kogyo Co., Ltd., Saga, both of Japan

[21] Appl. No.: 138,843

[22] PCT Filed: Mar. 26, 1986

[86] PCT No.: PCT/JP86/00139

§ 371 Date: Nov. 25, 1987

§ 102(e) Date: Nov. 25, 1987

[87] PCT Pub. No.: WO87/05855

PCT Pub. Date: Oct. 8, 1987

[51] Int. Cl.⁴ .............................................. B29C 47/30
[52] U.S. Cl. .................................. 425/464; 264/177.12
[58] Field of Search ............................. 425/463, 464; 264/177.12

[56] References Cited

U.S. PATENT DOCUMENTS

| | | | |
|---|---|---|---|
| 3,038,201 | 6/1962 | Harkenrider | 425/197 |
| 3,790,654 | 2/1974 | Bagley | 264/177.11 |
| 3,877,857 | 4/1975 | Melead | 425/463 X |
| 3,941,550 | 3/1976 | Marion | 425/463 |
| 4,298,564 | 11/1981 | Higuchi et al. | 425/464 X |
| 4,349,329 | 9/1982 | Naito et al. | 264/177.12 X |
| 4,364,888 | 12/1982 | Levin | 264/177.12 |

FOREIGN PATENT DOCUMENTS

| | | | |
|---|---|---|---|
| 57-3780 | 1/1982 | Japan . | |
| 178712 | 11/1982 | Japan | 264/177.12 |
| 61-164 | 1/1986 | Japan . | |

Primary Examiner—Richard L. Chiesa
Attorney, Agent, or Firm—Flynn, Thiel, Boutell & Tanis

[57] ABSTRACT

An extrusion die for forming a honeycomb stucture has a lattice molding groove formed in the outlet surface of the die body. In the inlet surface of the die body there are formed plural independent supply passages that are opposite to the intersecting portions of the molding groove and extend toward the outlet surface. A through hole is designed to communicate adjacent supply passages at a place that forms part of the partition wall between the supply passages and contacts with the molding groove. This through hole takes the combined shape of a trapezoid with the width of the molding groove as its top side and with the diameter of the supply passage as its maximum base side and a semicircle having said base side as its diameter.

3 Claims, 2 Drawing Sheets

DIE FOR MOLDING HONEYCOMB STRUCTURES

TECHNICAL FIELD

This invention relates to a die for molding honeycomb structures, in particular to a die for extrusion molding honeycomb structures using plastic materials that exhibit a water-releasing phenomenon when pressurized and thereby deteriorate their flow.

BACKGROUND ART

Various methods for forming honeycomb structures have been proposed up to now. However, the honeycomb structures used as catalysts, whose core length is exceedingly longer than the core cross section, have normally been formed by extrusion molding using dies. Accordingly, it is safe to say that the shapes and structures of the dies constitute very important factors for obtaining honeycomb structures. Generally speaking, the die used for extrusion molding is arranged to form a lattice molding passage in the outlet surface of the die, and further to form a supply passage that is opposite to the intersecting portion of said molding passage in the inlet surface of the die opposite to said outlet surface and has a depth penetrating to the bottom of said molding passage. When carrying out extrusion molding by the use of the thus constructed die, if the plastic material to be extrusion molded is not arranged to pass through the lattice molding passage at a substantially uniform speed, there are caused defects such as distortion of the resulting honeycomb structure, blur inside the partition wall, partial vanishing of the lattice (which is called "hanging" hereinafter) and the like.

Accordingly, in order that the plastic material to be extrusion molded may be extruded at a uniform speed from every portion of the molding passage, there have been proposed various methods designed to form a through hole along the lattice at the place connecting the supply passage with the molding groove of the die.

The typical die of this sort has been disclosed in Japanese Published Utility Model Gazette No. 3780/1982 Specification, which is shown as the prior art in FIG. 1. In this drawing, the reference numeral 21 stands for a die, wherein a lattice molding passage 22 is formed in its outlet surface 23; plural and independent supply passages 25 are formed in a raw material inlet surface 24 opposite thereto, said passages being opposite to the intersecting portions of said molding passage 22 and extending toward the outlet surface 23; and a large number of independent circular holes 26, whose diameters is larger than the passage thickness, penetrate from the sides of the die along the rear end of the molding passage 22 so as to cross each other.

In Japanese Laid Open Patent Gazette No. 178712/1982 Specification, furthermore, there is disclosed a die for molding a honeycomb structure characterized by the feature that in order to prevent the hanging phenomenon of the honeycomb structure to be produced, the through hole of the die takes the form of an oblong or a rectangle whose long diameter/short diameter ratio is 1.2–5 and further the ratio of the short diameter of the through hole to width of the lattice cut-in passage is arranged to be in the range of 1.2–10.

In Japanese Published Patent Gazette No. 164/1986 Specification, still further, there is disclosed a die characterized by the feature that a guide groove corresponding to the through hole is formed, the cross-sectional opening area of said guide groove is larger than that of a molding passage, and further a resistance portion guide groove is formed corresponding to a supply passage portion.

However, these prior art dies (apparatuses) for molding honeycomb structures can not necessarily obtain moldings that satisfy the requirements of extrusion molding ability, the properties of the obtained honeycomb structures such, for instance, as distortion, hanging and mechanical strength, and the properties such as cracking and the like occurring at the time of drying and calcining, depending upon the properties of plastic materials to be extrusion molded.

Especially when extrusion molding a honeycomb structure raw material consisting mainly of titanium oxide and/or silica-alumina and a fibrous substance-containing plastic material that exhibits a water-releasing phenomenon when pressurized and deteriorates its fluidity, it was difficult for the usual molding dies to maintain a good molding ability because masses caused by a partial water-releasing phenomenon within the through hole block up part of the molding passage, the fibrous substance clings to part of the molding passage to thereby form a non-flowing section, the resulting honeycomb structure is subject to hanging, and the extruding pressure increases gradually in the course of molding.

The object of this invention is to provide a die for molding a honeycomb structure suitable for extrusion molding a plastic material containing a fibrous substance that exhibits a water-releasing phenomenon when pressurized and deteriorates its flow.

DISCLOSURE OF THE INVENTION

This invention provides a die for molding a honeycomb structure possessing a mutually communicating molding passage having a sectional shape corresponding to that of a honeycomb core and having at a predetermined depth from the outlet surface of the die to the inlet surface of the die, and plural mutually independent supply passages that are opposite to intersecting portions and/or acute side portions of said molding passage and have a predetermined depth from the inlet surface of the die to the outlet surface of the die, wherein a through hole for communicating mutually adjacent supply passages is provided at a place forming part of each partition wall between supply passages and connecting with said molding passage; the sectional shape of said through hole takes the combined shape of (1) a trapezoid in which the top end has the same width as the molding passage and the base end has the same diameter as the supply passage and (2) a semicircle having a diameter corresponding to the width of the base of said trapezoid; the included angle formed by extension lines of the oblique sides formed by joining both mutually corresponding ends of the top side and the base side of said trapezoid is not more than 60 degrees; the ratio of the sectional area (A) of the through hole to the sectional area (B) of the molding passage is in the range of 1.5–3.0; a length extending from the outlet to the inlet of the molding passage is in the range of 5–10 times the molding passage width; and a die mask is provided on the outer periphery of the end surface on the outlet side, said die mask having a portion corresponding to the through hole projected on the through hole side.

The die for molding honeycomb structures like this is suitable for extrusion molding plastic materials that exhibit a water-releasing phenomenon when pressurized and deteriorate their flow such, for instance, as materials consisting mainly of titanium oxide and/or silica-alumina, plastic materials containing fibrous substances, plastic materials containing zeolite substances and the like.

BEST MODE FOR CARRYING OUT THE INVENTION

In order to explain this invention in more detail, this invention will be explained with reference to FIGS. 2-5 hereinafter.

Figure 3:
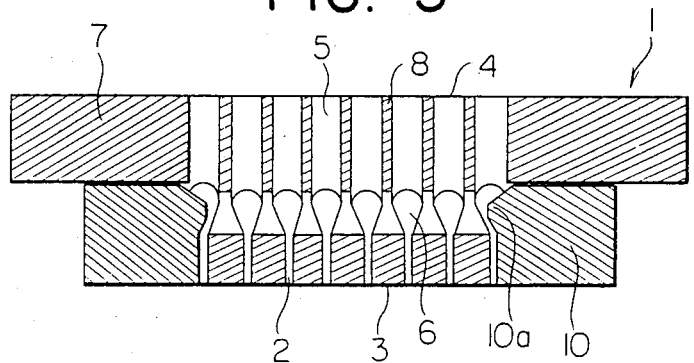
FIG. 3 is an enlarged longitudinal sectional view of the die according to this invention.
Figure 4:
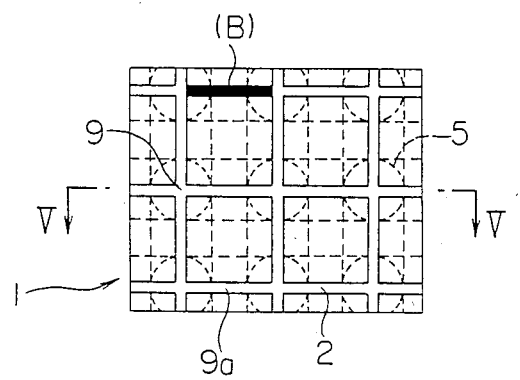
FIG. 4 is an enlarged view of the portion encircled by the chain line IV in FIG. 2.
Figure 5:
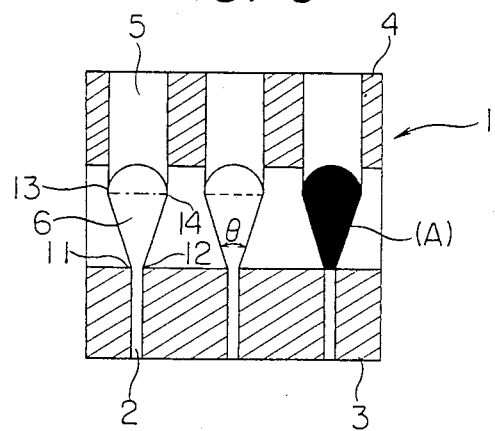
FIG. 5 is a view taken in the direction of the arrows along the line V—V of FIG. 4.

The reference numeral 1 denotes a square die. Like the conventional die shown in FIG. 1, this die is provided with a lattice molding passage 2 on its outlet surface 3, and is also provided with plural independent supply passages 5 on its opposite inlet surface 4 for raw materials. The supply passages 5 are opposite to intersecting portions 9 of the molding passage 2 and extend towards the outlet surface 3. These supply passages 5 may be disposed oppositely to side portions 9a of the lattice molding passage 2 in place of the intersecting portions 9. Through holes 6 for interconnecting the inner ends of adjacent supply passages 5 mutually are provided at places forming part of each partition wall 8 between supply passages 5 and said through holes also connect with the molding groove 2. Said through hole 6 has a cross-sectional shape which is a combination of (1) a trapezoid identified by points 11, 12, 13, 14 with the side defined by a line joining points 11, 12 at the inner end of the molding passage 2 being referred to as the top side and side defined by a line joining points 13, 14 at the inner end of the supply passage 5 being referred to as the base side, and (2) a semicircle having a diameter corresponding to the width of the base side 13-14 of said trapezoid. The included angle $\theta$ formed by extension lines of oblique sides 11-13 and 12-14 formed by joining both mutually corresponding ends of the top side 11-12 and the base side 13-14 of the trapezoid 11, 12, 13, 14 is not more than 60 degrees, and the ratio of the sectional area (A) of the through hole 6 to the sectional area (B) of the molding passage 2 is in the range of 1.5-3.0. Further, said die 1 is provided on the outer periphery of the outlet surface 3 of a die body 7 with a die mask 10 whose portion, corresponding to the through hole 6, projects into the through hole. In FIG. 3, the reference numeral 10a indicates the projecting portion of the die mask 10.

The thus prepared moldings such, for instance, as honeycomb structures used as catalysts, in particular honeycomb structures consisting mainly of titanium oxide and the like used as denitrifying catalysts, involve the problem that especially when said structure has an aperture of more than 150 mm square and a length of more than 350 mm, its mechanical strength weakens. In order to maintain the strength of honeycomb structures, therefore, it is customary that fibrous substances such, for instance, as glass fiber, asbestos, silicon nitride and the like should be added to the raw plastic materials, and then extrusion molded. However, there is an inclination that these fibrous substances have a bad influence upon the extrusion molding ability, and as the amounts of fibrous substances are increased and the extruding pressure is raised, the plastic materials undergo a water-releasing phenomenon and their flow deteriorates. Further, the fibrous substances added to the plastic materials stick to part of the molding groove, thereby resulting in non-flowing spots. The conventional dies were not necessarily satisfactory for extrusion molding the plastic materials as aforesaid into honeycomb structures.

This invention, in which the through hole 6 of the die 1 is shaped as described above, can decrease the non-flowing spots within the die and the degree of sticking of fibrous substances even when using the above mentioned plastic materials that are liable to cause a water-releasing phenomenon. This will be clarified by each example referred to afterwards. In case the included angle $\theta$ of the through hole 6 is more than 60 degrees, the non-flowing spots of the plastic material are eaily caused, whereby the extruding pressure is raised, and the resulting honeycomb structure is liable to undergo hanging at a high rate. In case the angle $\theta$ is reduced too much, in contrast, there is a tendency that the flow rate within the molding passage 2 toward the acute side 9a is reduced and thus the function of the molding passage is hampered. Therefore, it is preferable that the angle $\theta$ of the through hole 6 is in the range of 60-45 degrees.

In order to allow the plastic material to pass through the lattice molding passage 2 at a uniform rate, it is preferable that the ratio of the sectional area (A) of the through hole 6 to the sectional area (B) of the molding passage 2 is in the range of 1.5-3.0. In case the said sectional area ratio is less than 1.5, there is a tendency that the flow rate of the plastic material in the direction of the acute side portion 9a of the molding passage 2 (which will be called "horizontal direction" hereinafter) is reduced, and the flow rate from the acute side portion 9a becomes slow as compared with the crossing portion 9 of the molding passage 2. In case the above mentioned sectional area ratio is larger than 3.0, in contrast, there is caused a tendency opposite to the above mentioned one with undesirable results that the flow rate in the horizontal direction is increased and the passing velocity from the outer peripheral portion of the die is increased.

Compared with the case of extrusion molding the fibrous substance-free plastic material, when extrusion molding the plastic material that exhibits the water-releasing phenomenon as aforesaid, the molding pressure plays an important role in maintaining a good molding ability. The molding pressure, although being dependent upon the properties of the plastic materials, is largely influenced by the die. Consequently, the extrusion molding pressure can be held low for a long period of time by limiting the distance from the outlet surface 3 to the inner end (a point of contact with the through hole 6) of the molding passage 2 of said die 1 to from 5-10 times the width of the molding passage 2. In the case of extrusion molding the honeycomb structure like the above mentioned denitrifying catalyst, it is desirable also from the view point of the pore volume affecting the catalytic activity to carry out the extrusion molding under the pressure of 2.5 Kg/cm$^2$ or less, because the extrusion molding under the high pressure decreases the macro pore volume.

According to the die 1 of this invention, furthermore, the die mask 10 is provided on the side of the through hole 6 with a projection 10a for the purpose of controlling the extruding velocity from the outer periphery of the outlet surface 3.

Examples of this invention will be shown hereinafter.

EXAMPLE 1

A plastic material (X) suitable for extrusion molding was prepared by adding glass fiber, clay component, polyethylene oxide and water to titanium oxide powder and mingling same.

The die 1 was set in a two-stage single shaft type vacuum extruder for use. Said die 1 was designed to have a through hole 6 whose angle θ is 60 degrees, a core with an aperture 161 mm square and 20×20, the width of molding passage 2 of 1.4 mm, the ratio of the sectional area (A) of the through hole 6 to the sectional area (B) of the molding passage 2 of 2.7, and the ratio of the length of the molding passage 2 to the width of the molding passage 2 of 5.1. By using the die 1 like this, said plastic material (X) was extrusion molded into a lattice honeycomb structure having an aperture of 161 mm square and a length of 1 m. 50m-continuous extrusion molding was conducted while holding the extrusion molding pressure within the range of 16–17 Kg/cm². The obtained 50 pieces of honeycomb structures were dried and calcined. The structures were found to be of good quality, namely free from hanging, cracking and distortion.

EXAMPLE 2

The plastic material (X) used in Example 1 was extrusion molded by using the exactly same die used in Example 1 except that the ratio of the length of the molding passage 2 to the width of the molding passage 2 was changed into 7.3. 50m-continuous extrusion molding was conducted while holding the extrusion molding pressure within the range of 17–18 Kg/cm². The obtained 50 pieces of honeycomb structures were dried and calcined. These structures were found to be of good quality, namely free from hanging, cracking and distortion.

EXAMPLE 3

The plastic material (X) used in Example 1 was extrusion molded by using the exactly same die used in Example 1 except that the ratio of the length of the molding passage 2 to the width of the molding passage 2 was changed into 10. 50m-continuous extrusion molding was conducted while holding the extrusion molding pressure within the range of 21–22 Kg/cm².

The resulting honeycomb structures were dried and calcined. These structures were found to be of good quality, namely free from hanging, cracking and distortion.

EXAMPLE 4

The plastic material (X) used in Example 1 was extrusion molded by using the exactly same die as used in Example 1 except that the ratio of the sectional area (A) of the through hole 6 to the sectional area (B) of the molding passage 2 was changed into 1.6, and the ratio of the length of the molding passage 2 to the width of the molding passage 2 was changed into 7.3. 50m-continuous extrusion molding was conducted while holding the extrusion molding pressure within the range of 16–17 Kg/cm².

The resulting honeycomb structures were found to be of good quality, namely free from hanging, cracking and distortion.

Comparative Examples will be enumerated hereinafter.

COMPARATIVE EXAMPLE 1.

Figure 1:
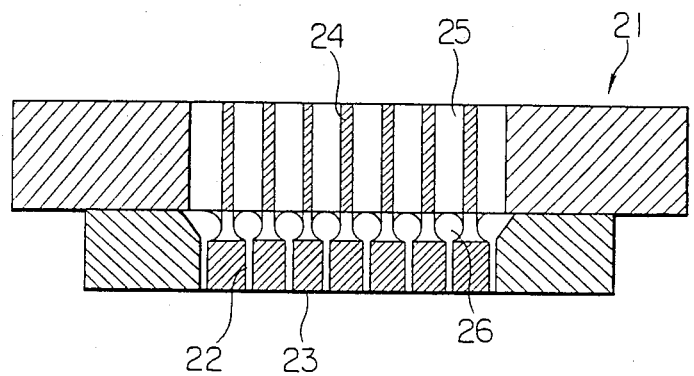
FIG. 1 is a longitudinal front view of a prior art for molding a honeycomb structure.
Figure 2:
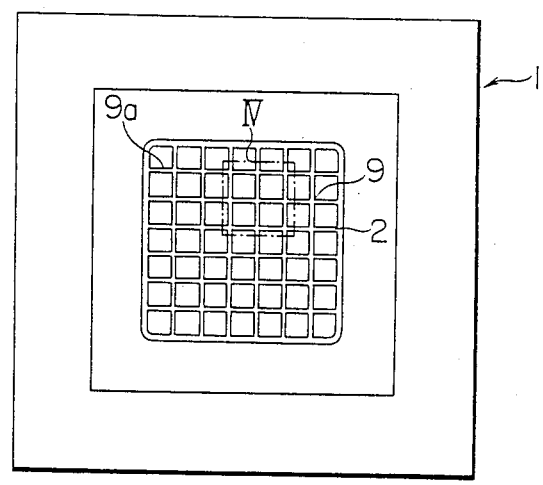
FIG. 2 is a plan view of the molding die according to this invention.

The plastic material (X) of Example 1 was extrusion molded by using a die 21 designed to have a circular through hole 26, the ratio of the sectional area (A) of said through hole, such as hole 26 in FIG. 1 to the sectional area (B) of the molding passage 22 of 3.1, the ratio of the length of the molding passage 22 to the width of the molding passage 22 of 7.3, a core with an aperture 161 mm square and 20×20 and a molding groove width of 1.4 mm as in FIG. 1. The extrusion molding pressure used was initially 21 Kg/cm², but said pressure increased to 26 Kg/cm² at the point of time when 10m-continuous extrusion molding had been completed. Thus, the extrusion molding was discontinued. Partial hanging phenomena were observed in 7 pieces of 10 pieces of the obtained honeycomb structures.

COMPARATIVE EXAMPLE 2

The plastic material (X) of Example 1 was extrusion molded by using exactly the same die as used in Example 1 except that the angle θ of the through hole 6 was changed into 80 degrees, the ratio of the sectional area (A) of the through hole 6 to the sectional area (B) of the molding passage 2 was changed into 2.5, and the ratio of the length of the molding passage 2 to the width of the molding passage 2 was changed into 10.9. 15m-continuous molding was conducted holding the extrusion molding pressures within the range of 23–27 Kg/cm².

The resulting 15 pieces of honeycomb structures were dried and calcined. Partial hanging phenomena were observed in 3 pieces thereof.

COMPARATIVE EXAMPLE 3

The plastic material (X) of Example 1 was extrusion molded by using exactly the same die 1 as used in Example 1 except that the ratio of the sectional area (A) of the through hole 6 to the sectional area (B) of the molding passage 2 was changed into 3.3, the ratio of the length of the molding passage 24 to the width of the molding passage 24 was changed into 7.3, and there was used a normal die mask lacking the projection 10a. 10m-continuous molding was conducted holding the extrusion molding pressure within the range of 18–21 Kg/cm². Referring to the molding state, it was observed that since the outer peripheral portion of the die was extruded at a very high speed, the outer peripheral portion of the thus obtained honey comb structure was thickened. When this honeycomb structure was dried, there was observed partial cracking therein.

Industrial Applicability

This invention as aforesaid is available for molding of catalysts or carriers, molding of honeycomb-structured dry kneading agents or adsorbents, molding of organic fiber-containing ceramics and the like.

We claim:

1. A die possessing a mutually communicating molding passage having a sectional shape corresponding to that of a honeycomb core and having a predetermined depth from the outlet surface of the die to the inlet surface of the die, and plural mutually independent supply passages that are opposite to intersecting portions and/or acute side portions of said molding passage and have a predetermined depth from the inlet surface of the die to the outlet surface of the die, wherein a through hole for communicating mutually adjacent supply passages is provided at a place forming part of each partition wall between supply passages and connecting with said molding passage; the sectional shape of said through hole takes the combined shape of a trapezoid with the molding passage width as a top side and with the supply passage diameter as a maximum base side and a semicircle having a diameter corresponding to the base side of said trapezoid; an angle formed by extension lines of oblique sides formed by joining both mutually corresponding ends of the top side and the base of said trapezoid is not more than 60 degrees; the ratio of the sectional area (A) of the through hole to the sectional area (B) of the molding passage is in the range of 1.5-3.0; and the length extending from the outlet to the inlet of the molding passage is in the range of 5-10 times as long as the molding passage width.

2. A die possessing a mutually communicating molding passage having a sectional shape corresponding to that of a honeycomb core and having a predetermined depth from the outlet surface of the die to the inlet surface of the die, and plural mutually independent supply passages that are opposite to intersecting portions and/or acute side portions of said molding passage and have a predetermined depth from the inlet surface of the die to the outlet surface of the die, wherein a through hole for communicating mutually adjacent supply passages is provided at a place forming part of each partition wall between supply passages and connecting with said molding passage; the sectional shape of said through hole takes the combined shape of a trapezoid with the molding passage width as a top side and with the supply passage diameter as a maximum base side and a semicircle having a diameter corresponding to the base side of said trapezoid; an angle formed by extension lines of oblique sides formed by joining both mutually corresponding ends of the top side and the base side of said trapezoid is not more than 60 degrees; the ratio of the sectional area (A) of the through hole to the sectional area (B) of the molding passage is in the range of 1.5-3.0; the length extending from the outlet to the inlet of the molding passage is in the range of 5-10 times as long as the molding passage width; and a die mask is provided on the outer periphery of the outlet surface of said die, the portion corresponding to the through hole of said die mask projecting on the through hole side.

3. An extrusion die having an inlet surface, an outlet surface, a grid-shaped molding passage extending inwardly from said outlet surface and being adapted for forming a material extruded through said die into a honeycomb structure, a plurality of mutually independent supply passages extending inwardly from said inlet surface, and partition walls separating said supply passages from each other; said extrustion die having a plurality of through holes located between the adjacent inner ends of said molding passage and said supply passages, said through holes extending through said partition walls to provide communication between the inner ends of mutually adjacent supply passages, said through holes communicating with spaced-apart zones on the inner end of said molding passage so that said supply passages are connected to said molding passage by said through holes, each of said through holes having a cross-sectional shape which is a combination of a tapezoid and a semicircle joined together, said trapezoid having a narrow end of the same width as the width of said molding passage and connected thereto, a pair of walls which diverge in a direction away from said molding passage and a base having the same width as the width of its associated supply passage, said semicircle extending from said base of said trapezoid to said associated supply passage and having a diameter corresponding to the width of said base of said trapezoid, the included angle defined by said trapezoid walls being from 45 to 60 degrees; the ratio of the sectional area (A) of the through hole to the sectional area (B) of the molding passage being in the range of from 1.5 to 3.0; and the length of said molding passage being from 5 to 10 times as long as the width of said molding passage.

* * * * *